(12) United States Patent
Durfee et al.

(10) Patent No.: US 8,944,143 B2
(45) Date of Patent: Feb. 3, 2015

(54) HOUSING FOR AN AIR CONDITIONING MODULE AND METHOD FOR PRODUCING SUCH A HOUSING

(75) Inventors: Jason Durfee, Troy, MI (US); Richard Browne, Canton, MI (US); Scott Torok, Allen Park, MI (US)

(73) Assignee: Mahle Behr USA Inc., Troy, MI (US)

( * ) Notice: Subject to any disclaimer, the term of this patent is extended or adjusted under 35 U.S.C. 154(b) by 2139 days.

(21) Appl. No.: 11/739,383

(22) Filed: Apr. 24, 2007

(65) Prior Publication Data
US 2007/0246187 A1 Oct. 25, 2007

Related U.S. Application Data

(60) Provisional application No. 60/794,507, filed on Apr. 25, 2006.

(51) Int. Cl.
| | | |
|---|---|---|
| B60H 1/00 | (2006.01) | |
| F28D 1/06 | (2006.01) | |
| F28F 7/00 | (2006.01) | |
| F24F 13/20 | (2006.01) | |

(52) U.S. Cl.
CPC ............ *F24F 13/20* (2013.01); *B60H 1/00514* (2013.01); *B60H 1/00521* (2013.01); *B60H 1/00528* (2013.01); *B60H 2001/00621* (2013.01); *B60H 2001/00635* (2013.01)
USPC ................... 165/41; 165/42; 165/72; 165/75; 165/77

(58) Field of Classification Search
USPC ................... 165/41–44, 202–204, 72–75, 77; 62/239, 244
See application file for complete search history.

(56) References Cited

U.S. PATENT DOCUMENTS

| | | | | |
|---|---|---|---|---|
| 4,250,959 A * | 2/1981 | Spasojevic | ...................... | 165/61 |
| 4,475,687 A * | 10/1984 | Schulz et al. | ................... | 165/77 |
| 4,608,834 A * | 9/1986 | Rummel | ......................... | 62/244 |
| 4,637,222 A * | 1/1987 | Fujiwara et al. | ............... | 62/244 |
| 5,103,651 A * | 4/1992 | Coelho et al. | ................... | 62/341 |
| 5,588,480 A * | 12/1996 | Armanno, Sr. | .................. | 165/41 |
| 5,685,165 A * | 11/1997 | Bigelow, Jr. | ..................... | 62/420 |
| 5,865,032 A * | 2/1999 | MacPherson et al. | .......... | 62/3.62 |
| 6,394,325 B1 * | 5/2002 | Taylor | ............................ | 224/274 |
| 6,773,477 B2 * | 8/2004 | Lindsay | ........................ | 55/385.3 |
| 7,007,494 B2 * | 3/2006 | Al Rashidi | ...................... | 62/244 |
| 7,073,338 B2 * | 7/2006 | Harwood et al. | ............... | 62/244 |
| 7,185,725 B2 * | 3/2007 | Iwasaka et al. | ................. | 180/90 |
| 7,281,971 B2 * | 10/2007 | Tohda et al. | .................... | 454/139 |
| 7,963,315 B2 * | 6/2011 | Ishikawa | ......................... | 165/42 |
| 8,403,029 B2 * | 3/2013 | Nanaumi et al. | ................ | 165/42 |
| 8,511,371 B2 * | 8/2013 | Onda et al. | ..................... | 165/202 |
| 8,544,528 B2 * | 10/2013 | Seto et al. | ........................ | 165/42 |
| 8,662,157 B2 * | 3/2014 | Kitamura et al. | ............... | 165/42 |
| 8,662,158 B2 * | 3/2014 | Seto et al. | ........................ | 165/42 |
| 2002/0134090 A1 * | 9/2002 | Rudick et al. | ................ | 62/238.2 |
| 2003/0154733 A1 * | 8/2003 | Ruiz et al. | ....................... | 62/246 |
| 2004/0031248 A1 * | 2/2004 | Lindsay | ........................ | 55/385.3 |
| 2005/0011205 A1 * | 1/2005 | Holmes et al. | .................. | 62/156 |
| 2005/0061498 A1 * | 3/2005 | Tohda et al. | .................... | 165/202 |
| 2005/0178128 A1 * | 8/2005 | Harwood et al. | ............... | 62/244 |
| 2006/0021376 A1 * | 2/2006 | Scroggs | ........................ | 62/457.7 |

(Continued)

*Primary Examiner* — Ljiljana Ciric
(74) *Attorney, Agent, or Firm* — Foley & Lardner LLP

(57) ABSTRACT

A housing for an air conditioning module, in particular for an air conditioning module of a vehicle, includes a hinged cover for at least one part of the air conditioning module. The hinged cover can be molded in one piece with the housing and the housing can include a living hinge.

8 Claims, 5 Drawing Sheets

(56) References Cited

U.S. PATENT DOCUMENTS

| | | | |
|---|---|---|---|
| 2006/0054304 A1* | 3/2006 | Tonhaeuser et al. | 165/44 |
| 2006/0076379 A1* | 4/2006 | Hussaini et al. | 224/275 |
| 2009/0044932 A1* | 2/2009 | Blackstone | 165/121 |
| 2010/0154454 A1* | 6/2010 | Blackstone | 62/259.3 |

\* cited by examiner

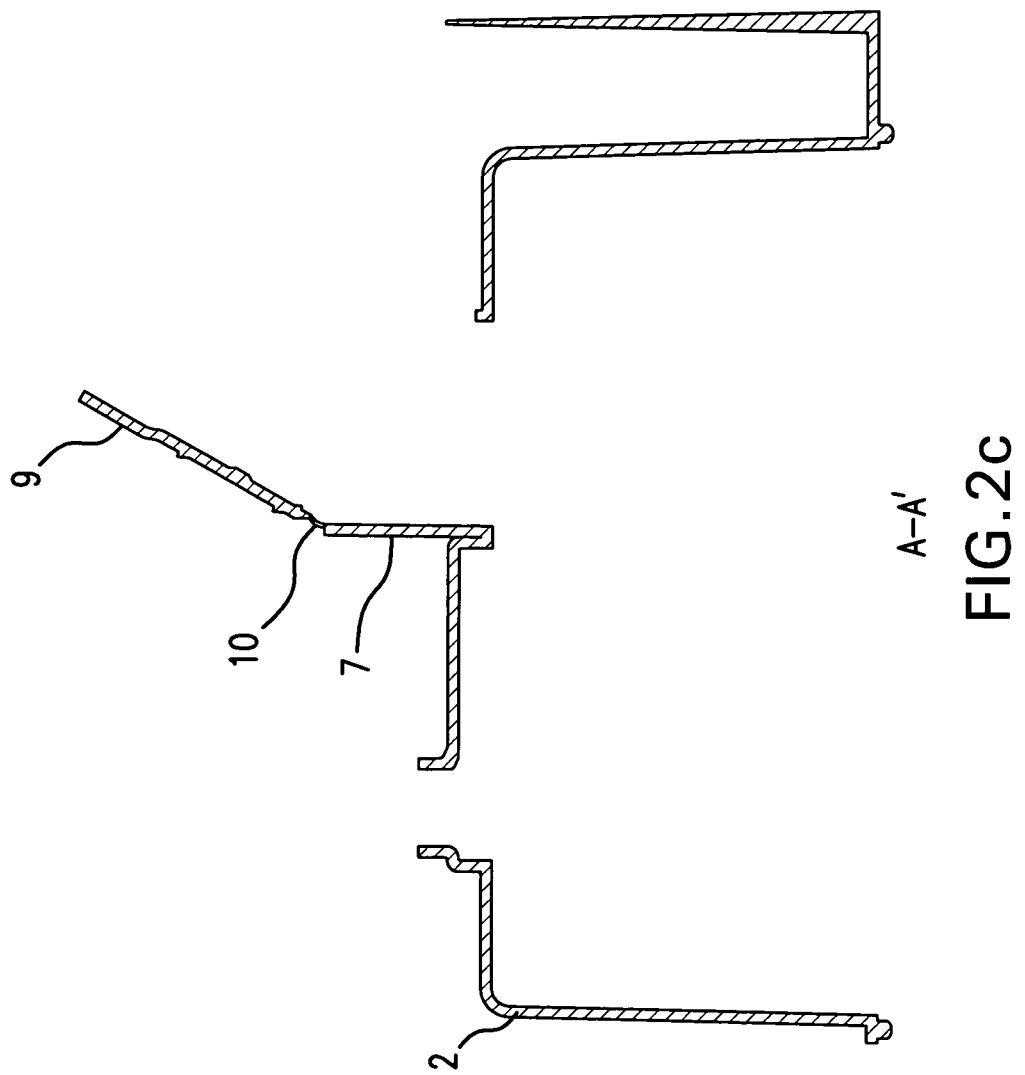

HOUSING FOR AN AIR CONDITIONING MODULE AND METHOD FOR PRODUCING SUCH A HOUSING

The right of priority is claimed under 35 U.S.C. §119(e) based on U.S. Provisional Application Ser. No. 60/794,507, filed Apr. 25, 2006, the entire contents of which, including the specification, drawings, claims and abstract, are incorporated herein by reference.

TECHNICAL FIELD

The invention relates to a housing for an air conditioning module, in particular for an air conditioning module of a vehicle.

BACKGROUND OF THE INVENTION

Air conditioning, usually in the form of "heating, ventilation and air conditioning" (HVAC), is a preferred way to achieve a moderate indoor climate in buildings and vehicles. Especially in vehicles, offering only little space, air conditioning modules are used. Usually, they are at least partially contained in a respective housing. They may comprise several sub-parts such as a blower, a heater core and an evaporator or a combination thereof. The sub-parts are mounted within respective sections of a housing. This improves the handling of the air conditioning module during transport and installation. Besides, it prevents direct contact of the sub-parts with external objects such as a user's body and alleviates the effects of such a contact, respectively. An air conditioning module of this kind, having a one-piece housing half shell, is described in DE 103 50 449 A1, for example.

Like most technical devices air conditioning modules and their housings have to be designed to allow maintenance access. For this purpose U.S. Pat. No. 5,180,004, describing an integrated heater-evaporator core, shows a housing having two removable covers, one for a blower and one for the unitized heater and evaporator core. Each cover can be removably secured to the housing by respective threaded fasteners to provide access for service requirements.

In other cases, molded clips or snaps are known to be used to close an opening of a housing of an air conditioning module.

These techniques known in prior art have several disadvantages. They require handling with multiple separate components, resulting in a high production complexity. Besides, they are complex regarding the case of maintenance access for the same reasons.

SUMMARY OF THE INVENTION

It is an object of the invention to specify an improved housing for an air conditioning module and a method for producing such a housing, by which production and maintenance complexity can be reduced.

According to the invention, an improved housing comprises a hinged cover for a part of the air conditioning module. This way, the number of components for closing the housing can be reduced as the cover is permanently connected to the housing. This reduces production complexity. The handling during maintenance is also facilitated as the cover cannot be removed and thus cannot get lost. It does not even have to be held at all in order to prevent it from falling off.

In a preferred embodiment the internal component of the air conditioning module is a heater core assembly, but it may also be an integrated heater-evaporator. This embodiment enables retention of the heater core assembly and an integrated heater-evaporator core, respectively, in the air conditioning module. It also protects the core tube clips against external mechanical impacts. Additionally, the risk for a user in case of a coolant leakage is reduced by the housing according to the invention.

Advantageously, the housing is a molded plastic housing. Such a housing can be produced cost-efficiently by molding the housing and the cover in one production step. After molding them apart from each other they can get connected.

According to another aspect of the invention, said cover is hinged via a molded living hinge. Such a living hinge can be molded cost-efficiently in the same production step as the housing and the cover. For example, after molding it apart from the housing and/or from the cover can be inserted into respective recesses of the housing and of the cover for connecting them.

In an especially preferred embodiment said cover is molded in one piece with the housing. This reduces the number of parts to be handled. Additional steps of connecting the cover with the housing via the living hinge, which instead is integrated into the one piece, can be omitted this way. Complex precautions for creating recesses are not required. It is preferred to mold said cover and said living hinge into said housing in an open state of said cover. The part of the air conditioning module that has to be covered can then be mounted into the housing without adjusting the cover before.

Advantageously, said cover is hinged to a first supporting element protruding from the housing. The first supporting element can be, for example, a wall projecting beyond the housing. Thus, said part of the air conditioning module can be covered partially only, i. e. can be laterally accessible. It can also be completely covered if said cover has side walls. Such an embodiment having a first supporting element may be of particular use if the part of the air conditioning module to be covered is locally space-consuming or has lines leading to or away from it. It is also possible to provide more than one first supporting element, e. g. several single pads.

According to another aspect of the invention, a second supporting element is arranged at the housing in an area of said cover and off a hinge axis of said cover. The cover can thus be supported on both the first and the second supporting element for a defined closed state.

The cover can be positioned easily if said second supporting element comprises a fastening means. The fastening means may be, for example, an internal thread for a screw, a clamp, a tension band fastener or a bracket fastener. The fastening means is preferably non-detachable, so maintenance access is facilitated.

Advantageously, the cover comprises a recess for a fastener to hold the cover closed. This allows for holding the cover in a closed state with a defined position. The recess can be closed all around if the fastener is a screw or can be laterally opened if the fastener is a tension band. For a clamp or a bracket fastener, no recess is required at all.

Further objects, features and advantages of the present invention will become apparent from the detailed description of preferred embodiments that follows, when considered together with the accompanying figures of drawing.

BRIEF DESCRIPTION OF THE DRAWINGS

FIG. 2c shows a corresponding cross section thereof.

DETAILED DESCRIPTION OF PREFERRED EMBODIMENTS

Figure 1A:
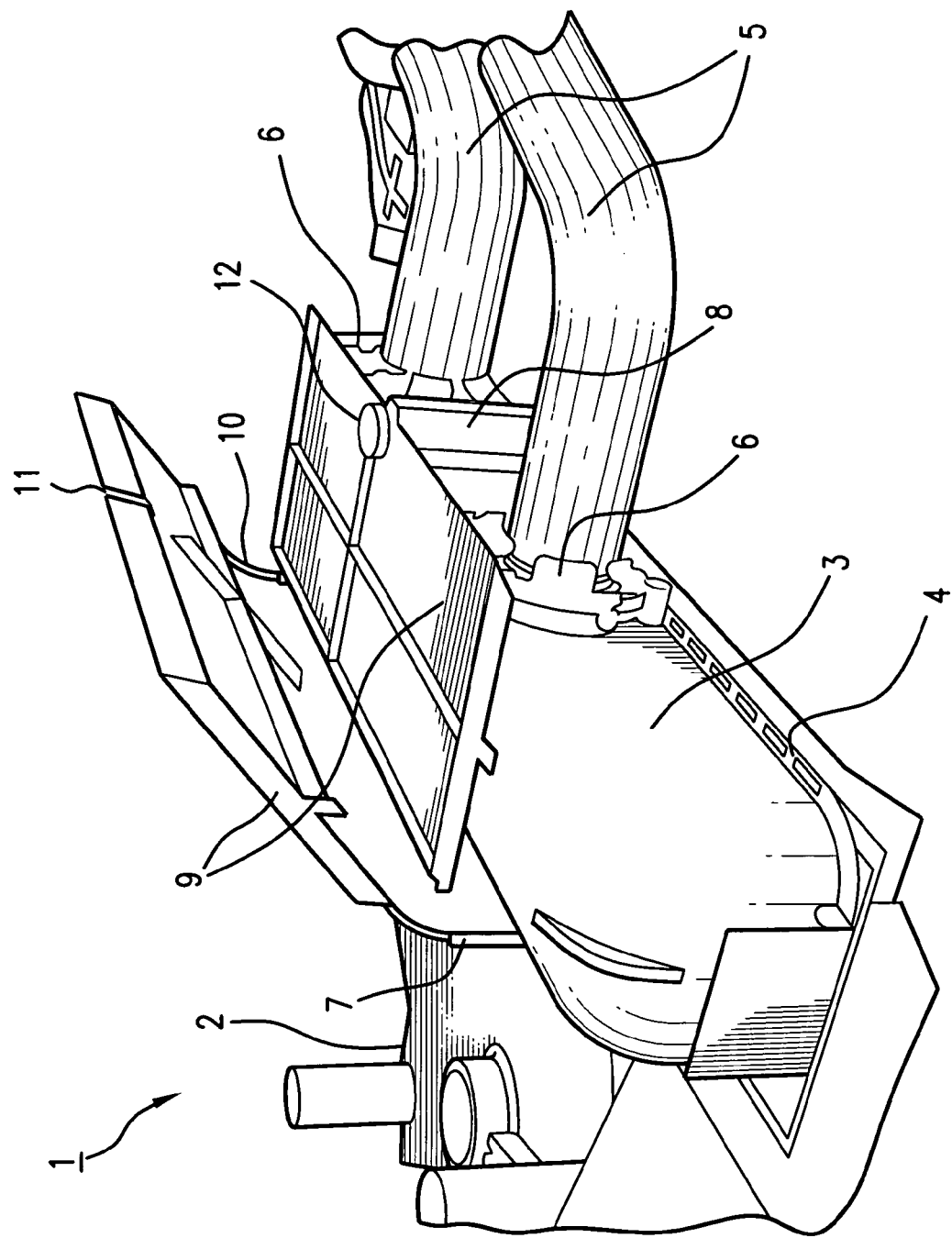
FIG. 1a shows a perspective side view onto an air conditioning module having a housing with a hinged cover in an open state and in a superimposed closed state.

The air conditioning module 1 shown in FIG. 1a is partially contained in a housing 2 which is a plastic molding half shell. It is equipped with a heater core 3 projecting beyond the surface of the housing 2 through an opening 4. The air conditioning module 1 is provided for a vehicle such as a car. The heater core 3 is connected with two lines 5 outside the housing 2 by respective tube clips 6. The housing 2 provides retention for the heater core 3 within the air conditioning module 1.

A first supporting element 7 in the form of a wall protrudes from the housing 2 on one side of the heater core 3. A second supporting element 8 in the form of a wall protrudes from the housing 2 on the opposite side of the heater core 3, comprising an exemplary internal thread (not shown) in its top surface (not shown). Both supporting elements 7, 8 are preferably molded in one piece with the housing 2 and thus are part of it.

A cover 9 which is a molded plastic member is preferably hinged to the first supporting element 7 by a living hinge 10. Both the cover 9 and the living hinge 10 are molded in one piece with the first supporting element 7, i. e., with the housing 2, and thus are part of the housing 2. The cover 9 comprises a recess 11, which is laterally opened, for a fastener 12, e. g., in the form of a screw.

The cover 9 is simultaneously depicted in two states, open and closed. It has been molded in the open position, so the heater core 3 is accessible afterwards for connecting it with the lines 5 without first adjusting the state of the cover 9. Finally, the cover 9 is folded down until it strikes the second supporting element 8, where it is fixed by the fastener 12 which is driven through the recess 11 into the internal thread of the second supporting element 8.

Figure 1B:
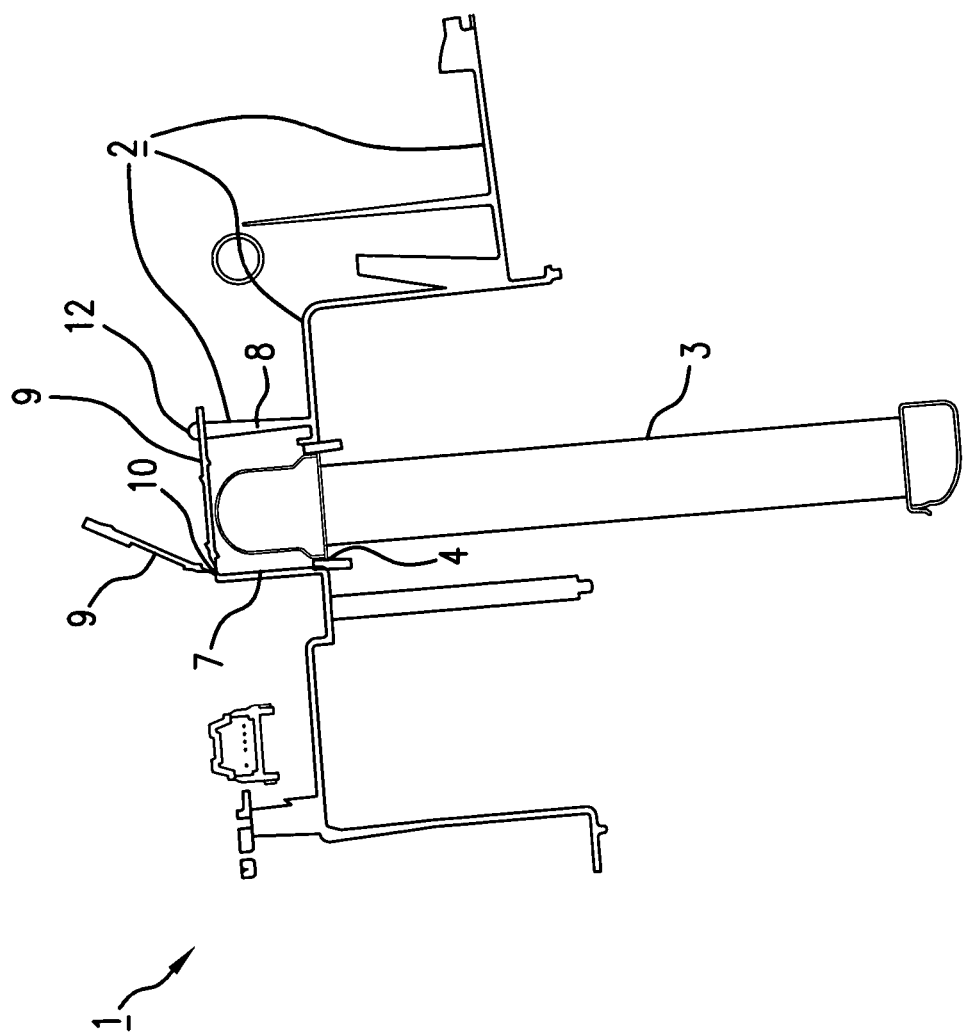
FIG. 1b shows a simplified cross section through the air conditioning module.

In FIG. 1b the same air conditioning module 1 is illustrated in a cross section. The heater core 3 is depicted in its full length. The cover 9 is shown in both states, open and closed. It is held closed by the fastener 12. It is evident that only one loose component, the fastener 12 in the form of the screw, is needed for fixing the cover 9. Besides, the cover 9 cannot fall off, as it is undetachable in one piece with the housing 2 via the living hinge 10 and the first supporting element 7. For these reasons, production and maintenance complexity is reduced.

Figure 2A:
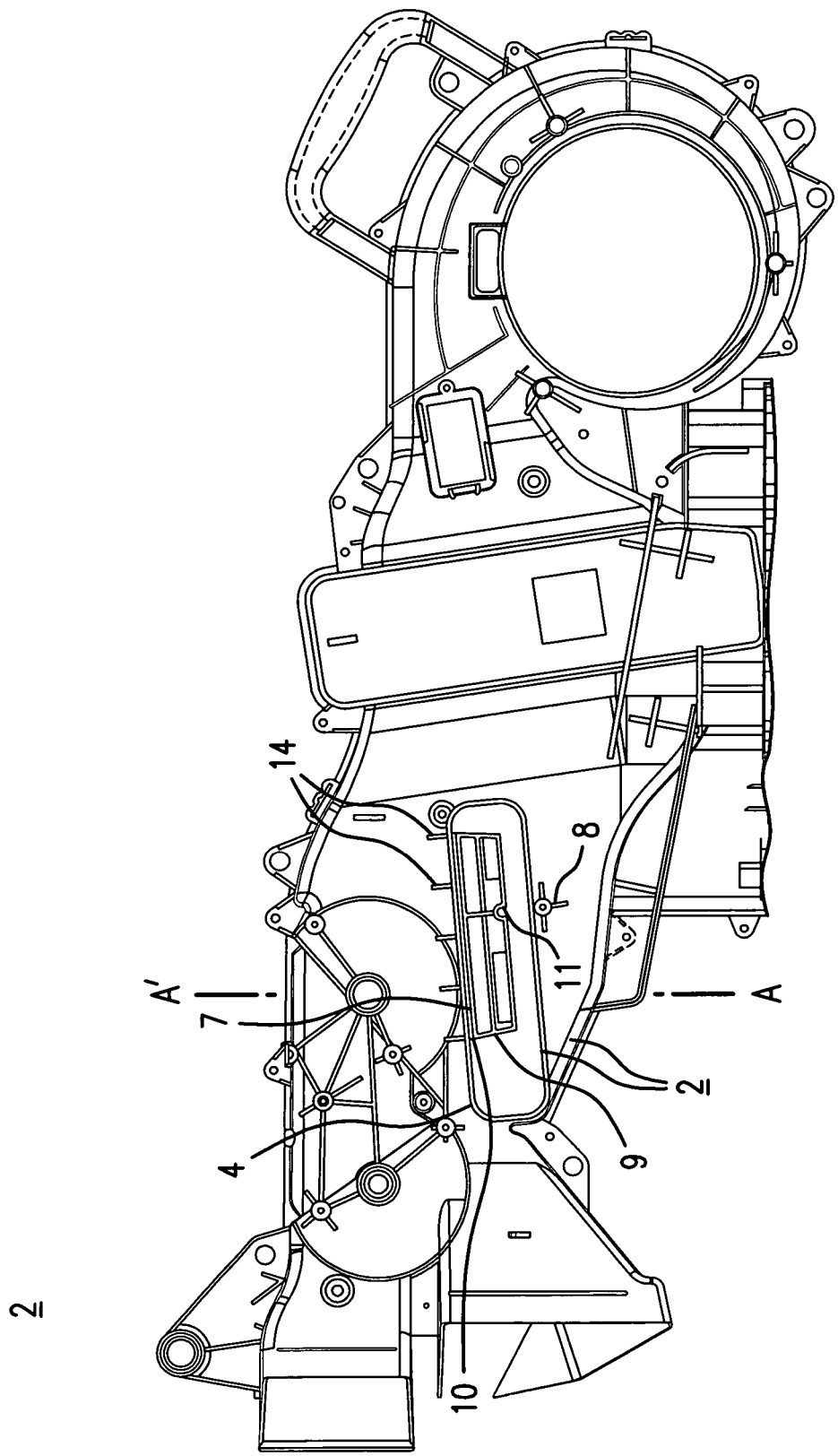
FIG. 2a shows a side view onto a housing according to the invention.

In FIG. 2a a complex housing 2 of another air conditioning module 1 is depicted. It is a half shell that can be connected with a corresponding half shell to fully enclose an air conditioning module. Above an opening 4 for a heater core 3, a cover 9 is hinged to first supporting element 7 adjacent to the opening 4 and protruding from the housing 2. The wall is reinforced by multiple trusses 14 at its back. On the opposite side of the opening 4 a second supporting element 8 protrudes from the housing 2, comprising an exemplary internal thread for a screw. The cover 9 comprises a corresponding recess 11 to allow for fixing it to the second supporting element 8 by the screw.

The cover 9 is molded in one piece with a living hinge 10, the first supporting element 7 and thus with the housing 2. The living hinge 10 permits rotation of the cover 9 between a closed state, where it strikes the second supporting element 8, and an open state, where the opening 4 and a part mounted within or behind it can be accessed, respectively.

Figure 2B:
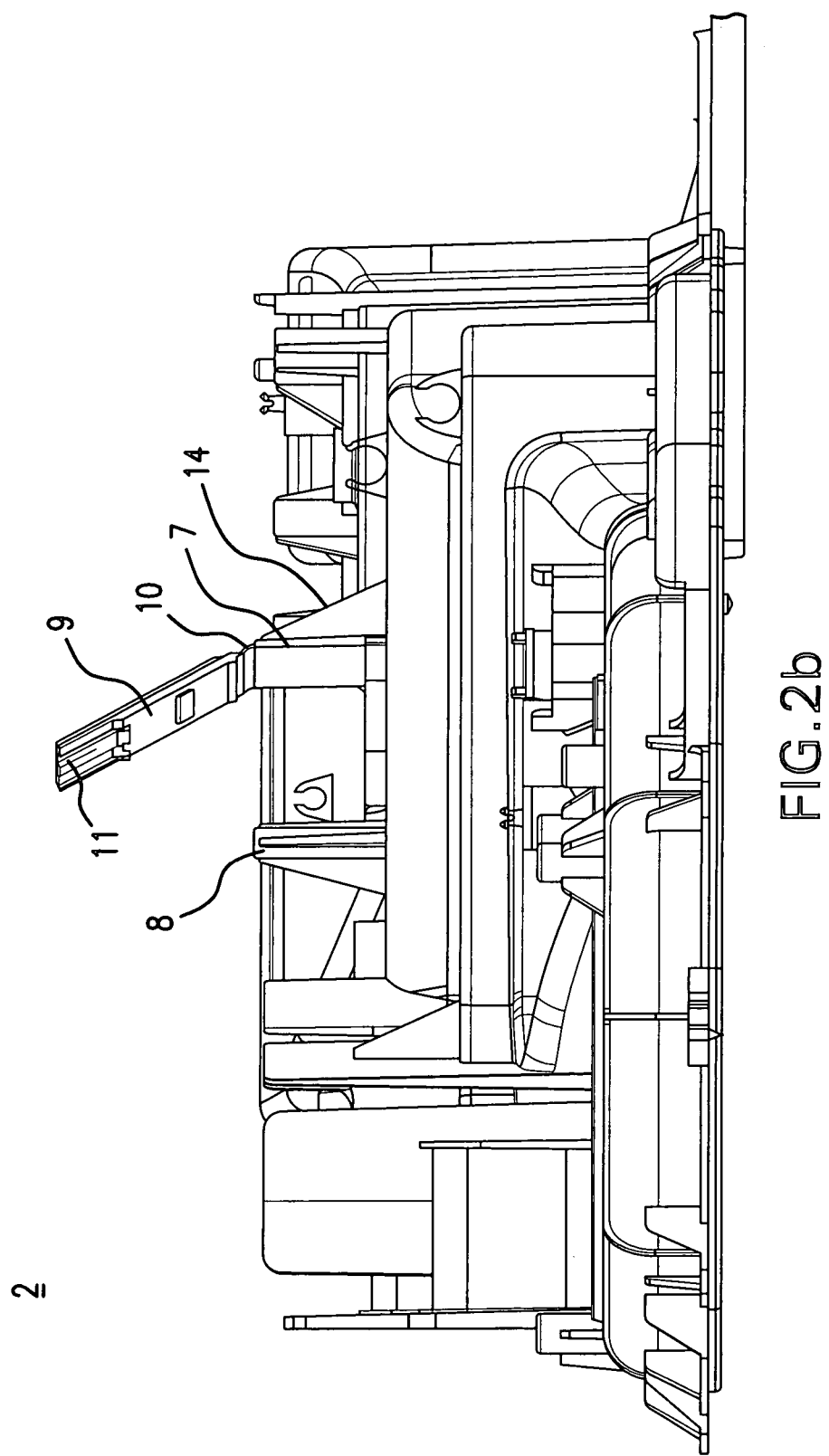
FIG. 2b shows a corresponding rear view onto this housing.

In FIG. 2b, which is a rear view onto the housing of FIG. 2a, the cover 9 is shown in its open state.

FIG. 2c shows a cross section along the line AA' of FIG. 2a. The cover 9 is in its open state. It can be seen that, in this case, the living hinge 10 is significantly thinner than the first supporting element 7 and the cover 9, which makes it flexible.

In other embodiments (not shown) the living hinge 10 may be a separate component that is inserted into one or more recesses in the first supporting element 7 or in the housing 2 and into one or more recesses of the cover 9, after molding these. The living hinge 10 may also be molded in a different production step from the housing 2. The cover 9 may alternatively be hinged to the first supporting element 7 or the housing 2 by a separate conventional hinge-joint. Such a hinge-joint may comprise metal parts.

Further embodiments (not shown) may include more than one first supporting element 7 and/or more than one second supporting element 8, fixing the cover 9 by several fasteners. Instead of one or more screws, one or more clamps, tension bands or bracket locks may be used, for example. They are preferably arranged undetachably at the respective second supporting elements 8. This reduces production and maintenance complexity even further.

In other embodiments it is possible to use separate supporting elements 7, 8 which are connected to the housing 2 by clipping, screwing or the like. In such embodiments, the cover 9 is preferably hinged to the first supporting element 7 as described above.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

The invention claimed is:

1. A housing for an air conditioning module suitable for use in a vehicle, comprising:
   a hinged cover for at least one part of said air conditioning module,
   wherein said part of said air conditioning module comprises a heater core assembly,
   wherein said cover is hinged to a first supporting element protruding from the housing on a first side of the heater core assembly, and
   wherein the cover is configured to cover part of the heater core assembly, and comprises a rectilinear recess in the cover on a side disposed closer to a second side of the heater core assembly than to the first side of the heater core assembly.

2. The housing according to claim 1, wherein the housing comprises a molded plastic shell.

3. The housing according to claim 1, wherein said cover is hinged via a molded living hinge.

4. The housing according to claim 3, wherein said cover is molded in one piece with the housing.

5. The housing according to claim 1, further comprising a second supporting element arranged at the housing in an area of said cover and off a hinge axis of said cover.

6. The housing according to claim 5, wherein said second supporting element comprises a fastener.

7. The housing according to claim 1, wherein said recess receives a fastener configured to hold the cover closed.

8. An air conditioning module suitable for use in a vehicle, comprising:
- a housing,
- a heater core assembly,
- a hinged cover for at least one part of said air conditioning module,
- wherein the cover is hinged to a first supporting element protruding from the housing on a first side of the heater core assembly, and
- wherein the cover is configured to cover part of the heater core assembly, and comprises a rectilinear recess in the cover on a side disposed closer to a second side of the heater core assembly than to the first side of the heater core assembly.

\* \* \* \* \*